United States Patent
Jung et al.

(10) Patent No.: US 9,955,399 B2
(45) Date of Patent: Apr. 24, 2018

(54) METHOD FOR RESELECTING MBMS-BASED CELLS IN WIRELESS COMMUNICATION SYSTEMS, AND APPARATUS FOR SUPPORTING SAME

(71) Applicant: LG ELECTRONICS INC., Seoul (KR)

(72) Inventors: Sunghoon Jung, Anyang-si (KR); Youngdae Lee, Anyang-si (KR); Sungjun Park, Anyang-si (KR); Seungjune Yi, Anyang-si (KR); Sangwon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 14/389,962

(22) PCT Filed: Apr. 4, 2013

(86) PCT No.: PCT/KR2013/002824
§ 371 (c)(1),
(2) Date: Oct. 1, 2014

(87) PCT Pub. No.: WO2013/151360
PCT Pub. Date: Oct. 10, 2013

(65) Prior Publication Data
US 2015/0071157 A1    Mar. 12, 2015

Related U.S. Application Data

(60) Provisional application No. 61/620,967, filed on Apr. 5, 2012.

(51) Int. Cl.
| | |
|---|---|
| *H04W 36/28* | (2009.01) |
| *H04W 36/08* | (2009.01) |
| *H04W 4/06* | (2009.01) |
| *H04W 48/20* | (2009.01) |
| *H04W 48/12* | (2009.01) |

(52) U.S. Cl.
CPC ............ *H04W 36/28* (2013.01); *H04W 4/06* (2013.01); *H04W 36/08* (2013.01); *H04W 48/20* (2013.01); *H04W 48/12* (2013.01)

(58) Field of Classification Search
None
See application file for complete search history.

(56) References Cited

U.S. PATENT DOCUMENTS

2008/0268878 A1* 10/2008 Wang .................... H04W 68/00
455/458
2014/0241180 A1* 8/2014 Amerga ................ H04W 36/30
370/252

FOREIGN PATENT DOCUMENTS

| KR | 10-2005-0020720 | 3/2005 |
| KR | 10-2006-0135897 | 12/2006 |
| KR | 10-2010-0034012 | 3/2010 |

OTHER PUBLICATIONS

PCT International Application No. PCT/KR2013/002824, Written Opinion of the International Searching Authority dated Jul. 17, 2013, 1 page.

* cited by examiner

*Primary Examiner* — Chi H Pham
*Assistant Examiner* — Raul Rivas
(74) *Attorney, Agent, or Firm* — Lee, Hong, Degerman, Kang & Waimey

(57) ABSTRACT

Provided are a method performed by a user equipment in a wireless communication system and a user equipment performing the method. The method determines whether system information for a multicast broadcast multimedia service (MBMS) is a broadcast from a neighboring cell and reselects a cell by applying a highest priority to the frequency of a neighboring cell when the system information for the MBMS is the broadcast.

4 Claims, 12 Drawing Sheets

METHOD FOR RESELECTING MBMS-BASED CELLS IN WIRELESS COMMUNICATION SYSTEMS, AND APPARATUS FOR SUPPORTING SAME

CROSS-REFERENCE TO RELATED APPLICATIONS

This application is the National Stage filing under 35 U.S.C. 371 of International Application No. PCT/KR2013/002824, filed on Apr. 4, 2013, which claims the benefit of U.S. Provisional Application Ser. No. 61/620,967, filed on Apr. 5, 2012, the contents of which are all hereby incorporated by reference herein in their entirety.

BACKGROUND OF THE INVENTION

Field of the Invention

The present invention relates to wireless communications, and more specifically, to a cell reselection method based on an MBMS (Multicast Broadcast Multimedia Service) in a wireless communication system and an apparatus supporting the same.

Related Art

3GPP (3rd Generation Partnership Project) LTE (Long Term Evolution), an advancement version of UMTS (Universal Mobile Telecommunications System), is introduced in 3GPP release 8. 3GPP LTE adopts OFDMA (orthogonal frequency division multiple access) for downlink and SC-FDMA (Single Carrier-frequency division multiple access) for uplink. It adopts MIMO (multiple input multiple output) having up to four antennas. Recently, 3GPP LTE-A (LTE-Advanced), the evolution of 3GPP LTE, is in discussion.

A terminal represented by the mobile device may be on the move, and thus, a deterioration of the quality of service being presently provided or a cell providing a better service may be discovered. Accordingly, the terminal may shift to the new cell.

In order for the terminal to shift to the new cell, the terminal steadily performs measurement on the serving cell and neighbor cells. In case the result of measurement shows that conditions for making the shift are met, the terminal may receive an instruction from the serving cell or may directly move.

The terminal may receive a further enhanced service by maintaining the link to the cell offering a particular service or a cell permitted to access. As an example, it may be preferable that a terminal desiring to receive the MBMS (Multicast Broadcast Multimedia Service) may approach the cell providing the MBMS as possible to receive the service. As a method for the purpose, a separate priority may apply to the frequency of the cell providing the MBMS, so that the terminal may reselect the cell providing the MBMS as possible.

A terminal receiving the MBMS or desiring to receive the MBMS, in case departing from the cell coverage in which the MBMS is provided, may perform cell reselection by applying the higher priority to the frequency at which the MBMS is predicted to be provided. The target cell selected through such cell reselection may be a cell that does not actually provide the MBMS, and the terminal approaching such cell may be against the original purpose of performing cell reselection by adjusting the priority.

SUMMARY OF THE INVENTION

An object of the present invention is to provide a cell reselection method based on an MBMS which is performed by a terminal in a wireless communication system.

In an aspect, there is provided a cell reselection method performed by a terminal in a wireless communication system. The cell reselection method comprises determining whether system information for an MBMS (Multicast Broadcast Multimedia Service) is broadcast from a neighbor cell, and if the system information for the MBMS is broadcast, applying a highest priority to a frequency of the neighbor cell to perform cell reselection.

The system information for the MBMS may be SIB (System Information Block) 13 of system information broadcast from the neighbor cell.

The cell reselection method may further comprise, if the system information for the MBMS is not broadcast, applying a signaled priority to the frequency of the neighbor cell to perform the cell reselection.

The terminal may be receiving the MBMS or may be interested in receiving the MBMS.

The cell reselection method may further comprise, if as a result of applying the signaled priority to perform the cell reselection the terminal moves to a cell on a frequency different from the frequency, initiating a prohibit timer relating to a time period during which the highest priority is not applied to the frequency.

The cell reselection method may further comprise resetting the prohibit timer if the MBMS is provided at the frequency.

The cell reselection method may further comprise resetting the prohibit timer if a serving cell of the terminal is changed.

The cell reselection method may further comprise resetting the prohibit timer if a tracking area is changed.

In another aspect, there is provided a wireless device operated in a wireless communication system. The wireless device comprises an RF (Radio Frequency) unit transmitting and receiving a radio signal, and a processor operatively coupled with the RF unit. The processor is configured to determine whether system information for an MBMS (Multicast Broadcast Multimedia Service) is broadcast from a neighbor cell, and if the system information for the MBMS is broadcast, apply a highest priority to a frequency of the neighbor cell to perform cell reselection.

By the MBMS-based cell reselection method proposed herein, the terminal may be prevented from approaching the cell with the frequency at which no MBMS is actually provided. Further, in the environment where the radio resources are intended to switch from MBMS traffic to unicast traffic due to congestion, the terminals desiring to the MBMS are prevented from jamming up. That is, the terminal may identify whether the MBMS is indeed provided and might not apply the highest priority to the frequency of a corresponding cell. By doing so, the terminals may select and approach other cell on the high-priority frequency instead of the cell that does not provide the MBMS and has a low frequency priority. The terminal may be avoided from approach to the crowded cell, thus allowing for reception of a more efficient service. The network may provide an efficient service through proper load balancing.

DESCRIPTION OF EXEMPLARY EMBODIMENTS

Figure 1:
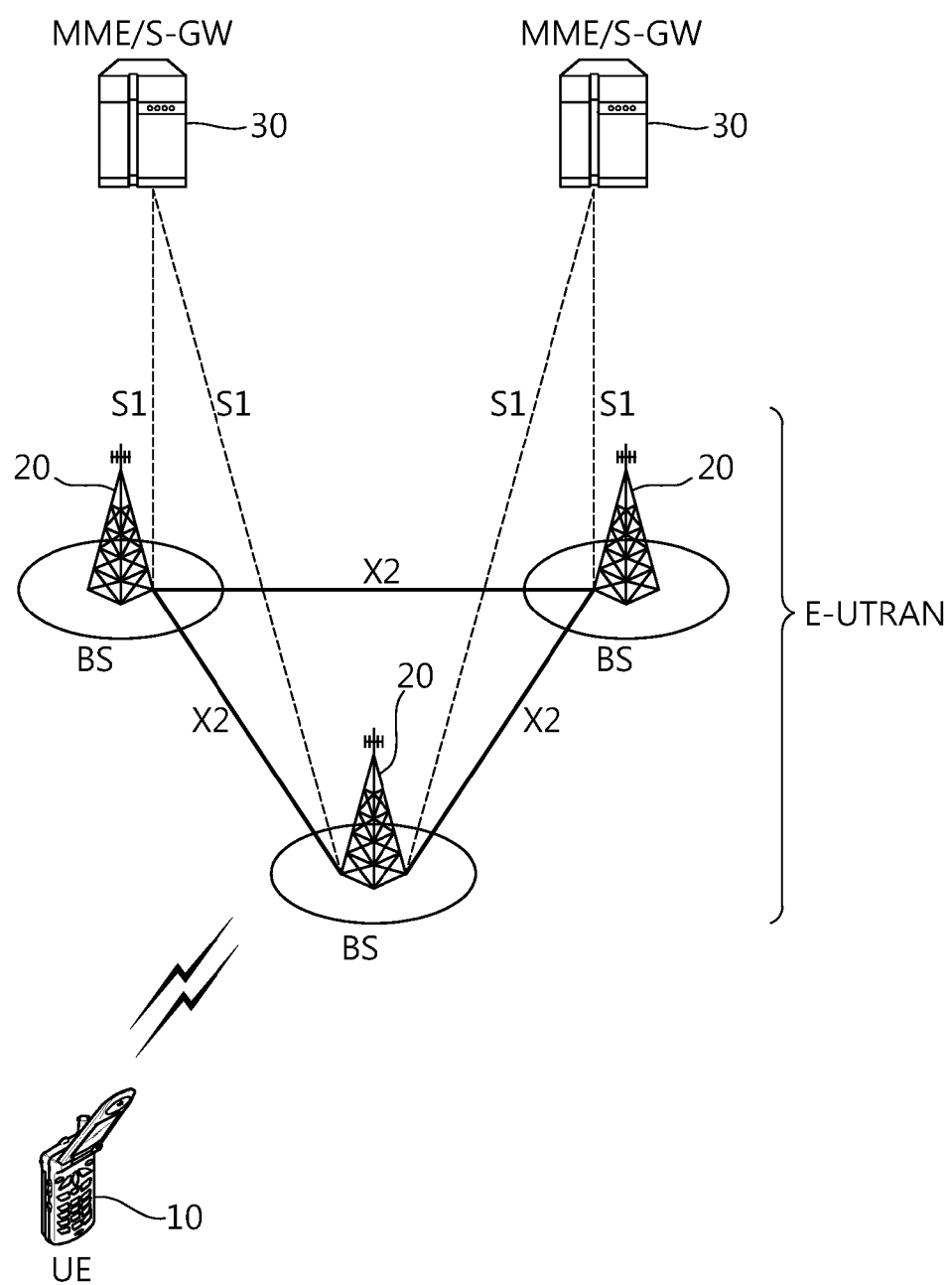
FIG. 1 illustrates a wireless communication system to which the present invention applies.

FIG. 1 illustrates a wireless communication system to which the present invention applies. This may also be referred to as E-UTRAN (Evolved-UMTS Terrestrial Radio Access Network), or LTE (Long Term Evolution)/LTE-A system.

The E-UTRAN includes a base station (BS) 20 providing a control plane and a user plane to a terminal (or user equipment; UE) 10. The terminal 10 may be stationary or mobile and may be referred to as MS (Mobile station), UT (User Terminal), SS (Subscriber Station), MT (mobile terminal), Wireless Device, etc. The base station 20 is a fixed station communicating with the terminal 10 and may be referred to as eNB (evolved-NodeB), BTS (Base Transceiver System), Access Point, etc.

The base stations 20 may be connected with each other through an X2 interface. The base stations 20 are connected through an S1-MME to an MME (Mobility Management Entity) and through an S1-U to an S-GW (Serving Gateway).

The EPC 30 includes an MME, an S-GW, and a P-GW (Packet Data Network-Gateway). The MME contains information on the terminal's access or information on the terminal's capability. Such information is primarily used for managing the terminal's mobility. The S-GW is a gateway having the E-UTRAN as its end point, and the P-GW is a gateway having the PDN as its end point.

The layers of the radio interface protocol between the terminal and the network may be classified into L1 (first layer), L2 (second layer), and L3 (third layer) based on the lower three layers in the open system interconnection (OSI) standard model widely known in the communication system art, and among them, the physical layer belonging to the first layer offers an information transfer service using a physical channel, and the RRC (Radio Resource Control) layer positioned in the third layer plays a role to control the radio resources between the terminal and the network. To the end, the RRC layer exchanges RRC messages between the terminal and base station.

Figure 2:
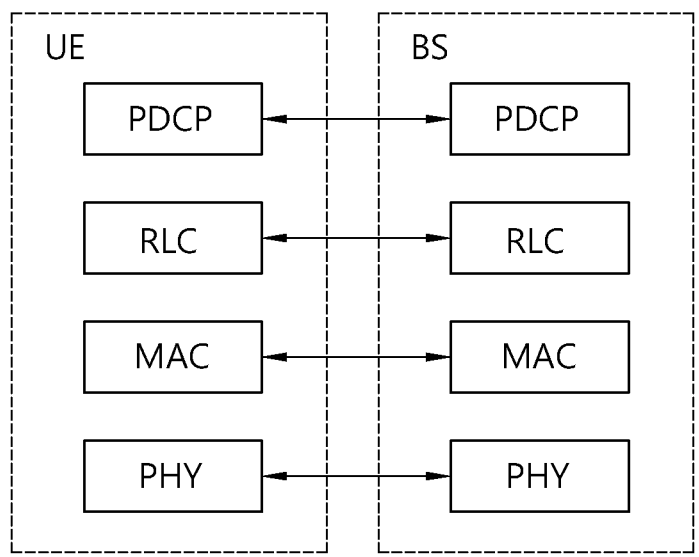
FIG. 2 is a block diagram illustrating a radio protocol architecture for user plane.
Figure 3:
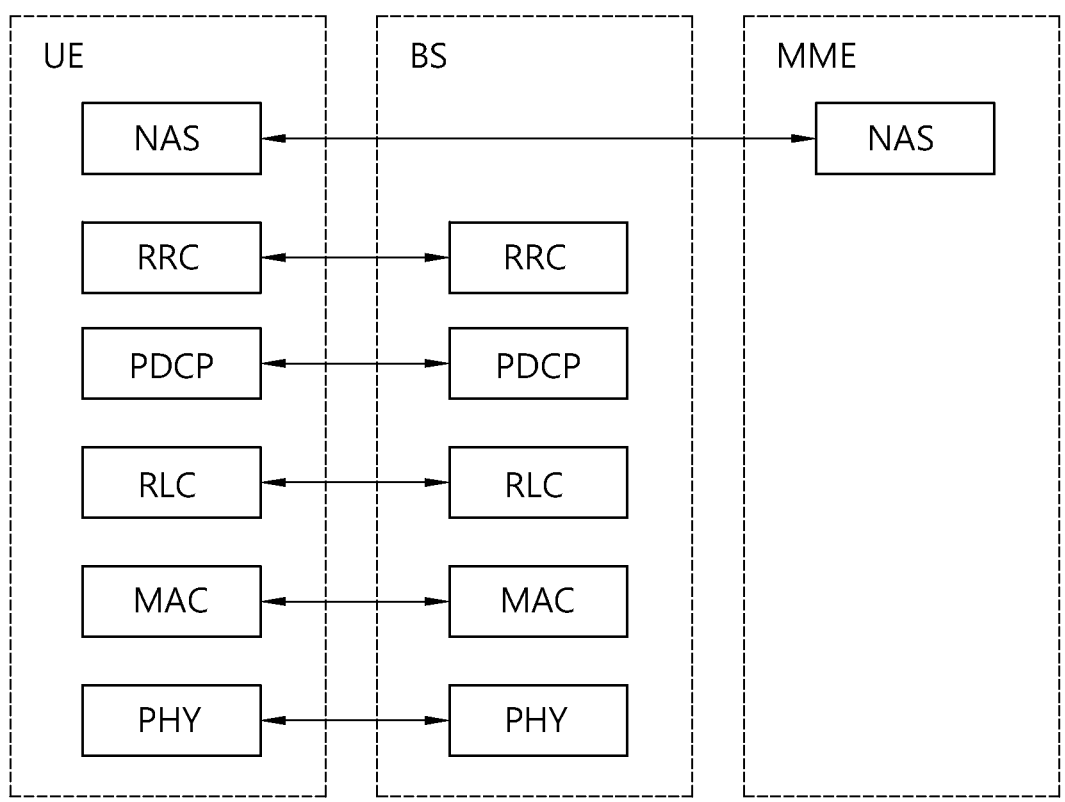
FIG. 3 is a block diagram illustrating a radio protocol architecture for control plane.

FIG. 2 is a block diagram illustrating a radio protocol architecture for user plane. FIG. 3 is a block diagram illustrating a radio protocol architecture for control plane.

The user plane is a protocol stack for transmitting user data, and the control plane is a protocol stack for transmitting control signals.

Referring to FIGS. 2 and 3, the physical layer (PHY layer) provides an information transfer service to a higher layer using a physical channel. The physical channel is connected with the MAC (Medium Access Control) layer, a higher layer, through a transport channel. Data flows through the transport channel between the MAC layer and the physical layer. The transport channels are classified depending on how data is transported through the radio interface with what features.

Data flows through the physical channel between different physical layers, i.e., between the physical layer of the transmitter and the physical layer of the receiver. The physical channel may be modulated in the OFDM (Orthogonal Frequency Division Multiplexing) scheme and makes use of time and frequency as radio resources.

The functions of the MAC layer include mapping between the logical channel and transport channel and multiplexing/demultiplexing of the MAC SDU (service data unit) belonging to the logical channel to the transport block provided to the physical channel over the transport channel. The MAC layer provides a service with the RLC (Radio Link Control) layer through the logical channel.

The functions of the RLC layer include concatenation, segmentation and reassembly of the RLC SDU. To guarantee various QoSs (Quality of Service) required by the radio bearer (RB), the RLC layer offers three operation modes including transparent mode ™, unacknowledged mode (UM), and acknowledged mode (AM). The AM RLC provides for error correction through ARQ (automatic repeat request).

The RRC (Radio Resource Control) layer is defined only in the control plane. The RRC layer is associated with the configuration, re-configuration and release of radio bearers and is in charge of control of the logical channel, transport channel, and physical channel. The RB means a logical path provided by the first layer (PHY layer) and the second layer (MAC layer, RLC layer, PDCP layer) for data transport between the terminal and the network.

The functions of the PDCP (Packet Data Convergence Protocol) layer in the user plane include transport of user data, header compression, and ciphering. The functions of the PDCP (Packet Data Convergence Protocol) layer in the control plane include transport of control plane data and ciphering/integrity protection.

"RB is configured" means a process of specifying the radio protocol layer and channel characteristics to provide a particular service and configuring each specific parameter and operation method. The RBs may be separated into two: SRB (Signaling RB) and DRB (Data RB). The SRB is used as a pathway to transmit an RRC message in the control plane, and the DRB is used as a pathway to transmit user data in the user plane.

If the RRC connection is established between the terminal's RRC layer and the E-UTRAN's RRC layer, the terminal is subjected to the RRC connected state, and is otherwise subject to RRC idle state.

As downlink transport channels for transmitting data from the network to the terminal, there are a BCH (Broadcast Channel) for transmitting system information and a downlink SCH (Shared Channel) for transmitting user traffic or control messages other than the system information. The downlink multicast or broadcast service traffic or control messages may be transmitted through the downlink SCH or through a separate downlink MCH (Multicast Channel).

Meanwhile, as uplink transport channels for transmitting data from the terminal to the network, there are an RACH (Random Access Channel) for transmitting initial control messages and an uplink SCH (Shared Channel) for transmitting user traffic or control messages other than the initial control messages.

As logical channels that are positioned higher than the transport channels and that are mapped with the transport channels, there are a BCCH (Broadcast Control Channel), a PCCH (Paging Control Channel), a CCCH (Common Control Channel), an MCCH (Multicast Control Channel), and an MTCH (Multicast Traffic Channel).

The physical channel consists of several OFDM symbols in the time domain and several sub-carriers in the frequency domain. One subframe includes a plurality of OFDM symbols in the time domain. The resource block is the unit for resource allocation and includes a plurality of OFDM symbols and a plurality of sub-carriers. Further, each subframe may make use of specific sub-carriers of specific OFDM symbols (e.g., the first OFDM symbol) of a corresponding subframe for the PDCCH (Physical Downlink Control Channel), i.e., L1/L2 control channel. The TTI (Transmission Time Interval) is the unit time of subframe transmission.

Hereinafter, the RRC state of the terminal and RRC connection method are described in detail.

The RRC state refers to whether the RRC layer of the terminal is in logical connection with the RRC layer of the E-UTRAN. In case the RRC layer of the terminal is connected with the RRC layer of the E-UTRAN, it is denoted RRC connected state, and is otherwise referred to as RRC idle state. In the RRC connected state, the terminal has RRC connection, and thus, the E-UTRAN may grasp the presence of the corresponding terminal in units of cells. Accordingly, the E-UTRAN may effectively control the terminal. In contrast, in the RRC idle state, the terminal cannot grasp the E-UTRAN, and is managed by the CN (core network) in units of tracking area that is a larger unit of area that the cell. That is, in the RRC idle state, only the presence of the terminal is grasped in larger area units, and in order to receive general mobile communication services such as voice or data, it should shift to the RRC connected state.

When the user powers on the terminal, the terminal first searches for a proper cell and then stays in the RRC idle state in the cell. In the RRC idle state, the terminal, when there is the need for establishing RRC connection, establishes RRC connection with the E-UTRAN through an RRC connection procedure and shifts to the RRC connected state. There may be several types of cases where the terminal that is in the RRC idle state needs to establish RRC connection. Such cases include, e.g., when uplink data transmission is needed, for example, due to the user's attempt to make a call or when a paging message is received from the E-UTRAN and a response message is transmitted in response thereto.

The NAS (Non-Access Stratum) layer positioned higher than the RRC layer performs the functions such as session management and mobility management.

In order to manage mobility of the terminal in the NAS layer, two states, such as EMM-REGISTERED (EPS Mobility Management-REGISTERED) and EMM-DEREGISTERED are defined, and such two states apply to the terminal and the MME. The terminal is initially in the EMM-DEREGISTERED state, and to access the network, the terminal performs a process of registering to a corresponding network through an initial attach procedure. If the attach procedure is successfully done, the terminal and the MME are in the EMM-REGISTERED state.

For managing the signaling connection between the terminal and the EPC, two states such as ECM (EPS Connection Management)-IDLE state and ECM-CONNECTED state are defined, and such two states apply to the terminal and the MME. If the terminal in the ECM-IDLE state establishes RRC connection with the E-UTRAN, the terminal is in the ECM-connected state. The MME that is in the ECM-IDLE state, if establishing an S1 connection with the E-UTRAN, becomes ECM-CONNECTED. When the terminal is in the ECM-IDLE state, the E-UTRAN does not contain context information on the terminal. Accordingly, the terminal performs a terminal-based mobility-related procedure such as cell selection or cell reselection without the need to receive a command from the network. In contrast, when the terminal is in the ECM-CONNECTED state, the terminal's mobility is managed by the command from the network. In case in the ECM-IDLE state, the position of the terminal is rendered to differ from the position known to the network, the terminal informs the network of its position through a tracking area update procedure.

Next, system information is described.

The system information includes necessary information that should be known to the terminal to access the base station. Accordingly, the terminal should be receiving all the system information prior to accessing the base station and should always have the latest version of system information. The system information should be known to all the terminals in one cell, and thus, the base station periodically transmits the system information.

As per 3GPP TS 36.331 V8.7.0 (2009-09) "Radio Resource Control (RRC); Protocol specification (Release 8)," Ch. 5.2.2, the system information is divided into MIB (Master Information Block), SB (Scheduling Block), and SIB System Information Block). The MIB allows the terminal to be aware of the physical configuration of the cell, for example, bandwidth. The SB indicates the transmission information of SIBs, for example, transmission period. The SIB is a set of system information relating to each other. For example, some SIB contains only information on the neighbor cell, and other SIB contains only information on the uplink radio channel used by the terminal.

In general, the services provided from the network to the terminal may be classified into the following three. Further, depending on what service may be provided to the terminal, the terminal differently recognizes the type of cell. The service types are first described below, and the cell types are then described.

1) Limited service: this service provides emergency call and earthquake and Tsunami warning system (ETWS) and may be offered in the acceptable cell.

2) Normal service: this service means a general service of public use and may be offered in the suitable or normal cell.

3) Operator service: this service means a service for communication network operators. This cell may be used only by the operators, but not by common users.

Regarding the service types offered from the cell, the cell types may be classified as follows:

1) Acceptable cell: cell where the terminal may receive the limited service. This cell is not barred in view of the terminal and satisfies the cell selection standards of the terminal.

2) Suitable cell: cell where the terminal may receive the normal service. This cell satisfies the conditions of the acceptable cell and additional conditions. As the additional conditions, this cell should belong to the PLMN (Public Land Mobile Network) to which the terminal may be linked, and this cell should not be barred from performing the terminal's tracking area update procedure. If the cell is a CSG cell, the terminal should access this cell as a CSG member.

3) Barred cell: cell where information indicating that the cell is the barred cell is broadcast.

4) Reserved cell: cell where information indicating the cell is the reserved cell is broadcast.

Figure 4:
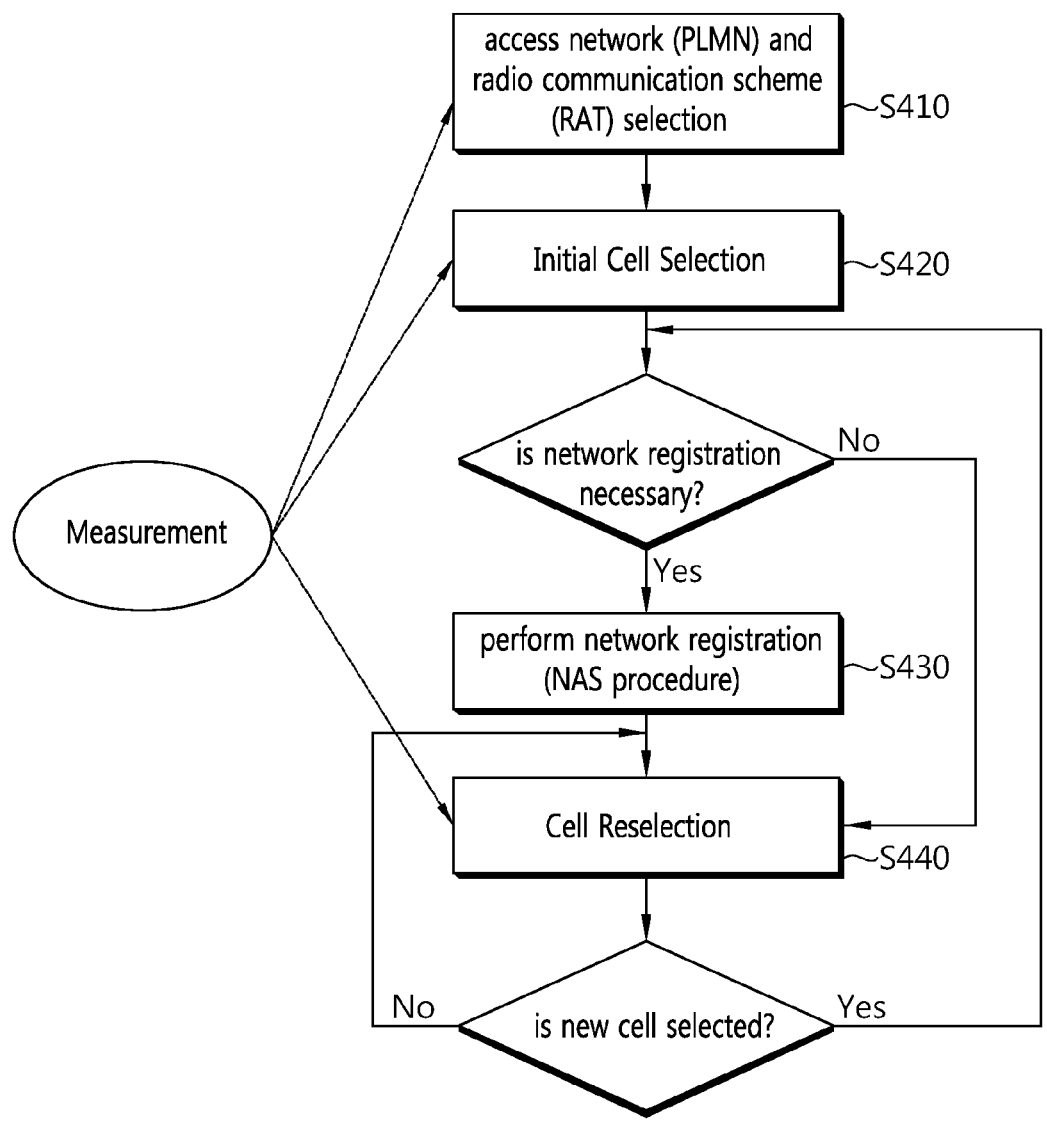
FIG. 4 is a flowchart illustrating the operation of a terminal in RRC idle state.

FIG. 4 is a flowchart illustrating the operation of a terminal that is in RRC idle state. FIG. 4 illustrates a procedure in which the terminal initially powered on is registered in the network through a cell selection process and as necessary cell reselection is performed.

Referring to FIG. 4, the terminal selects a radio access technology (RAT) for communicating with the network, PLMN (public land mobile network), from which the terminal desires to receive a service (S410). Information on the PLMN and RAT may be selected by the terminal's user or the information stored in the USIM (universal subscriber identity module) may be used.

The terminal selects a cell having the largest value among the cells whose signal strength or quality with respect to the measured base station is larger than a particular value (cell selection) (S420). This is that the powered-on terminal performs cell selection, and this may be denoted initial cell selection. The cell selection procedure will be described below in detail. After the cell selection, the terminal receives system information that is periodically transmitted from the base station. The above-mentioned particular value refers to a value defined in the system to guarantee the quality of physical signal in the data transmission/reception. Accordingly, the value may vary depending on RATs adopted.

The terminal conducts a network registration procedure in case network registration is needed (S430). The terminal registers its information (e.g., IMSI) to receive a service (e.g., paging) from the network. The terminal conducts network registration in case the information on the network (e.g., tracking area identity; TAI) received from the system information differs from the network information known to the terminal, rather than conducting registration to the network accessed whenever cells are selected.

The terminal performs cell reselection based on the terminal's environment or service environment provided from the cell (S440). If the quality or strength of signal measured from the base station from which the service is provided to the terminal is lower than a value measured from the base station of a neighbor cell, the terminal selects one of other cells providing better signal characteristics than the cell of the base station to which the terminal is linked. This process is denoted cell reselection as distinguished from the initial cell selection of the above no. 2 process. At this time, a temporal restriction is put to prevent cell reselection from frequently occurring depending on variations in signal characteristics. The cell reselection procedure is described below in detail.

Figure 5:
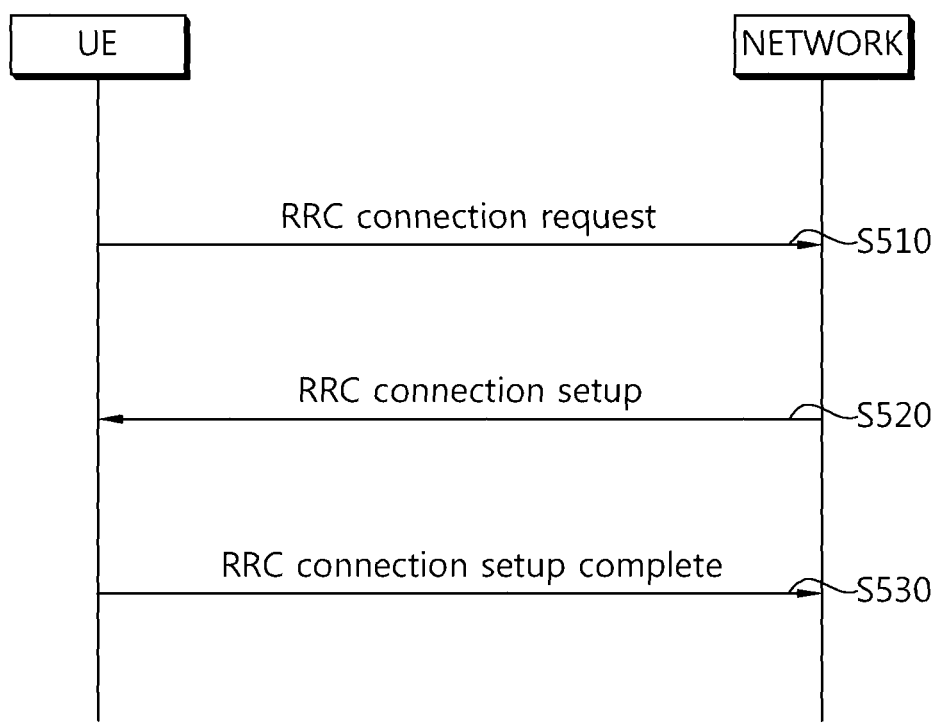
FIG. 5 is a flowchart illustrating a process of establishing RRC connection.

FIG. 5 is a flowchart illustrating a process of establishing a RRC connection.

The terminal sends an RRC connection request message to the network for requesting the RRC connection (S510). The network sends an RRC connection setup message (RRC connection configuration message) in response to the RRC connection request (S520). After receiving the RRC connection setup message, the terminal enters RRC connection mode.

The terminal sends to the network a RRC connection setup complete message used to identify successful completion of the RRC connection establishment (S530).

Figure 6:
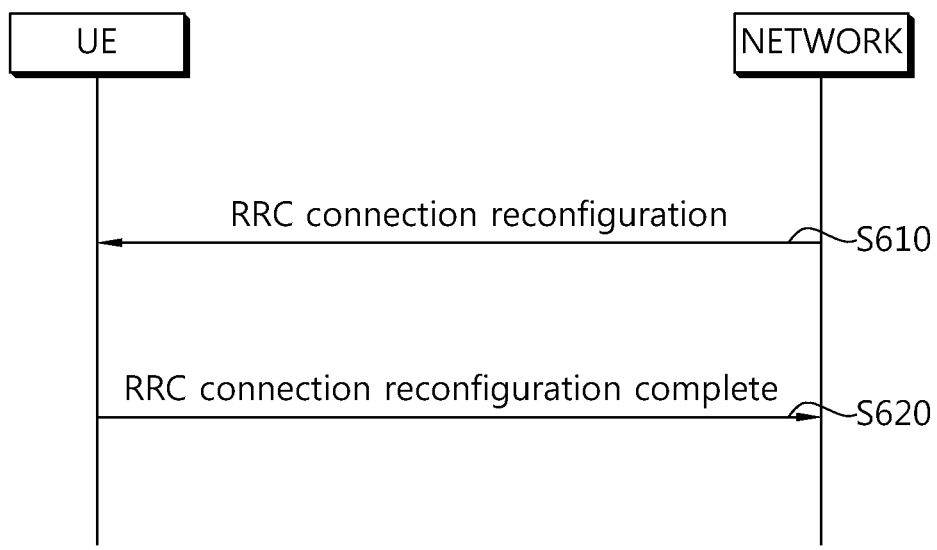
FIG. 6 is a flowchart illustrating an RRC connection reconfiguration process.

FIG. 6 is a flowchart illustrating an RRC connection reconfiguration process. The RRC connection reconfiguration is used to modify the RRC connection. This is used for RB establishment/modification/release, handover, measurement setup/modification/release.

The network sends to the terminal an RRC connection reconfiguration message to modify the RRC connection (S610). The terminal sends to the network an RRC connection reconfiguration complete message used to identify successful completion of the RRC connection reconfiguration in response to the RRC connection reconfiguration (S620).

Hereinafter, the PLMN (public land mobile network) is described.

The PLMN is a network deployed and operated by a mobile network operator. Each mobile network operator operates one or more PLMNs. Each PLMN may be identified by an MCC (Mobile Country Code) and an MNC (Mobile Network Code). The PLMN information of the cell is included in the system information and is broadcast.

In PLMN selection, cell selection, and cell reselection, various types of PLMNs may be considered by the terminal.

HPLMN (Home PLMN): PLMN having MCC and MNC that match MCC and MNC of terminal IMSI.

EHPLMN (Equivalent HPLMN): PLMN treated to be equivalent to HPLMN.

RPLMN (Registered PLMN): PLMN which successfully completed location registration.

EPLMN (Equivalent PLMN): PLMN treated to be equivalent to RPLMN.

Each mobile service customer enrolls in the HPLMN. When the general service is offered to the terminal by the HPLMN or EHPLMN, the terminal is not in the roaming state. In contrast, when the terminal is serviced by the PLMN other than the HPLMN/EHPLMN, the terminal is in the roaming state, and the PLMN is denoted VPLMN (Visited PLMN).

The terminal, when initially powered on, searches for available PLMNs (public land mobile networks) and selects a proper PLMN from which the terminal may be serviced. The PLMN is a network deployed or operated by the mobile network operator. Each mobile network operator operates one or more PLMNs. Each PLMN may be identified by an MCC (mobile country code) and an MNC (mobile network code). The cell's PLMN information is included in the system information and is broadcast. The terminal attempts to register the selected PLMN. In case the registration is successful, the selected PLMN becomes an RPLMN (registered PLMN). The network may signal the terminal with a PLMN list, and the PLMNs included in the PLMN list may be considered to be equal to the RPLMN. The terminal registered in the network should be always reachable by the network. If the terminal is in the ECM-CONNECTED state (equal to the RRC connected state), the network recognizes that the terminal is being in service. However, in case the terminal is the ECM-IDLE state (equal to the RRC idle state), the terminal's circumstance is not valid in the eNB, but is stored in the MME. In this case, the position of the terminal that is in the ECM-IDLE state is known to only the MME due to the granularity of the list of TAs (tracking areas). A single TA is identified by the TAI (tracking area identity) constituted of the PLMN identifier ton which the TA belongs and the TAC (tracking area code) uniquely representing the TA in the PLMN.

Subsequently, among the cells provided by the selected PLMN, a cell having the signal quality and characteristics, from which the terminal may receive a proper service is selected.

Next, a procedure of selecting a cell by the terminal is described in detail.

When powered on or staying in the cell, the terminal performs procedures for receiving a service by selecting/reselecting a cell with proper quality.

The terminal that is in the RRC idle state should always select a cell of proper quality and prepare to receive a service through the cell. For example, the terminal that has just powered on should select a cell of proper quality in order to register itself in the network. If the terminal that is in the RRC connected state enters the RRC idle state, the terminal should select to stay in the RRC idle state. As such, a process of selecting a cell satisfying any condition in order for the terminal to stay in service standby state such as the RRC idle state is referred to as cell selection. An important thing is that, since the cell selection is conducted under the circumstance where the terminal presently does not determine the cell to stay in the RRC idle state, the cell selection should be done as soon as possible. Accordingly, if a cell offers radio signal quality of a predetermined reference value or more, although this cell does not provide the best radio signal quality to the terminal, the cell may be selected in the cell selection process of the terminal.

A method and procedure of selecting a cell by a terminal in 3GPP LTE are now described in detail with reference to 3GPP TS 36.304 V8.5.0 (2009-03) "User Equipment (UE) procedures in idle mode (Release 8)."

The cell selection process is generally divided into two.

First, initial cell selection process. In this process, the terminal does not have previous information on the radio channel. Accordingly, the terminal searches for all the radio channels to discover a proper cell. In each channel, the terminal discovers the strongest cell. Thereafter, once the terminal finds a suitable cell meeting the cell selection standards, the terminal selects the cell.

Next, the terminal may select a cell by utilizing the information stored or information broadcast in the cell. Accordingly, cell selection may be quickly done as compared with the initial cell selection process. Once the terminal finds a cell satisfying the cell selection standards, the terminal selects the cell. If the terminal fails to find a proper cell satisfying the cell selection standards through this process, the terminal performs the initial cell selection process.

After the terminal selects a cell through the cell selection process, the strength or quality of signal between the terminal and the base station may vary due to the changes in the radio environment or terminal's mobility. Accordingly, if the quality of the selected cell is lowered, the terminal may choose another cell offering better quality. As such, in case another cell selection is performed, a cell providing better signal quality than the cell presently selected is selected. Such process is denoted cell reselection. The cell reselection process basically aims to choose a cell providing the best quality to the terminal in light of the quality of radio signal.

In other points of view than the quality of radio signal, the network may determine the priority per frequency and inform it to the terminal. When receiving such priority, the terminal considers the priority earlier than the radio signal quality standard.

As such, cell selection or reselection may be conducted depending on the signal characteristics of radio environment, and in selecting a cell for reselection upon cell reselection, there may be the following cell reselection methods depending on the cell RAT and frequency characteristics.

Intra-frequency cell reselection: the terminal reselects a cell having the same RAT and center frequency as the cell camping on.

Inter-frequency cell reselection: the terminal reselects a cell having the same RAT and a different center frequency from the cell camping on.

Inter-RAT cell reselection: the terminal reselects a cell using a different RAT than the RAT camping on.

The principle of the cell reselection process is as follows:

First, the terminal measures the quality of the serving cell and neighbor cell for cell reselection.

Second, the cell reselection is performed based on the cell reselection standards. The cell reselection standards have the following characteristics in relation to the measurement of the serving cell and neighbor cell.

The intra-frequency cell reselection is basically based on the ranking. The ranking is a task for defining criterion values for cell reselection evaluation and sorts the cells in order of size of the criterion values using the criterion values. The cell having the best criterion is often denoted best ranked cell. The cell criterion value is a value measured by the terminal on the cell, which is applied with a frequency offset or cell offset, as necessary.

The inter-frequency cell reselection is based on the frequency priority provided by the network. The terminal attempts to be able to camp on the frequency having the highest frequency priority. The network may provide the frequency priority that is to be commonly applied to the terminals in the cell through broadcast signaling or provide a per-frequency priority to each terminal through per-terminal signaling (dedicated signaling). The cell reselection priority provided through the broadcast signaling may be referred to as common priority, and the cell reselection priority set by the network for each terminal may be referred to as dedicated priority. The terminal, upon reception of the dedicated priority, may also receive the validity time relating to the dedicated priority. The terminal, upon reception of the dedicated priority, initiates the validity timer set as the validity time received together with the dedicated priority. The terminal applies the dedicated priority in the RRC idle mode while the validity timer operates. If the validity timer expires, the terminal discards the dedicated priority and goes back to the application of the common priority.

For the inter-frequency cell reselection, the network may provide the parameter used for cell reselection (for example, per-frequency offset (frequency-specific offset)) to the terminal for each frequency.

For the intra-frequency cell reselection or inter-frequency cell reselection, the network may provide a neighbor cell list (NCL) used for cell reselection to the terminal. This NCL includes a per-cell parameter (for example, cell-specific offset) used for cell reselection.

For the intra-frequency or inter-frequency cell reselection, the network may provide the terminal with a barred cell reselection list (black list). The terminal does not conduct cell reselection on the cells included in the barred list.

Subsequently, the ranking conducted in the cell reselection evaluation process is described.

The ranking criterion used to provide the cell's priority is defined as in Equation 1:

$$Rs = Qmeas,s + Qhyst,$$

$$Rn = Qmeas,n - Qoffset \qquad \text{[Equation 1]}$$

Here, $R_s$ is the ranking criterion of the serving cell, $R_n$ is the ranking criterion of the neighbor cell, $Q_{meas,s}$ is the quality value measured by the terminal for the serving cell, $Q_{meas,n}$ is the quality value measured by the terminal on the neighbor cell, $Q_{hyst}$ is the hysteresis value for ranking, and $Q_{offset}$ is the offset between two cells.

In the intra-frequency, in case the terminal receives the offset between the serving cell and the neighbor cell ($Q_{offsets,n}$), $Q_{offset}=Q_{offsets,n}$, and unless the terminal receives $Q_{offsets,n}$, $Q_{offset}=0$.

In the inter-frequency, in case the terminal receives the offset on the cell ($Q_{offsets,n}$), $Q_{offset}=Q_{offsets,n}+Q_{frequency}$, and unless the terminal receives $Q_{offsets,n}$, $Q_{offset}=Q_{frequency}$.

If the ranking criterion ($R_s$) of the serving cell and the ranking criterion ($R_n$) of the neighbor cell vary in the similar circumstance, the ranking order often changes due to the variation, so that the terminal may alternately reselect two cells. $Q_{hyst}$ is a parameter to give hysteresis in cell reselection to prevent the terminal from alternately reselecting the two cells.

The terminal measures $R_s$ of the serving cell and $R_n$ of the neighbor cell according to the above equation and considers the cell having the largest ranking criterion value as the best ranked cell and reselects this cell.

As per the above standards, it may be identified that the cell quality serves as the most critical standard in cell reselection. If the reselected cell is not the suitable cell, the terminal excludes the frequency or cell from cell reselection.

Hereinafter, RLM (Radio Link Monitoring) is described.

The terminal monitors the downlink quality based on the cell-specific reference signal to sense the downlink radio link quality of the PCell. The terminal estimates the downlink radio link quality for the purpose of monitoring the downlink radio link quality monitoring of the PCell and compares the same with the thresholds Qout and Qin. The threshold Qout is defined as a level where the downlink radio link cannot be stably received, and this corresponds to the 10% block error rate of the hypothetical PDCCH transmission) considering the PDFICH errors. The threshold Qin is defined as a downlink radio link quality level that allows for more stable reception than the level of Qout, and this corresponds to the 2% block error rate of the hypothetical PDCCH transmission considering PCFICH errors.

The radio link failure (RLF) is now described.

The terminal steadily performs measurement to maintain the quality of radio link with the serving cell receiving service. The terminal determines whether communication is impossible in the current circumstance due to a quality deterioration of the radio link with the serving cell. If the quality of the serving cell is too low to do communication, the terminal determines the current situation as the radio link failure.

If determined as radio link failure, the terminal gives up to maintain communication with the current serving cell, selects a new cell through cell selection (or cell reselection) procedure, and attempts to do RRC connection reestablishment.

The 3GPP LTE specifications enumerate examples in which normal communication is impossible as follows:

When the terminal determines based on the result of radio quality measurement of the physical layer that there is a serious problem with the downlink quality (when the quality of PCell is determined to be low while RLM is conducted).

When it is determined that there is a problem with the uplink transmission due to continuous failure of random access procedure in the MAC sublayer.

When it is determined that there is a problem with the uplink transmission due to continuous failure of uplink data transmission in the RLC sublayer.

When handover is determined to fail.

When the message received by the terminal fails to pass the integrity check.

Hereinafter, the RRC connection reestablishment procedure is described in greater detail.

Figure 7:
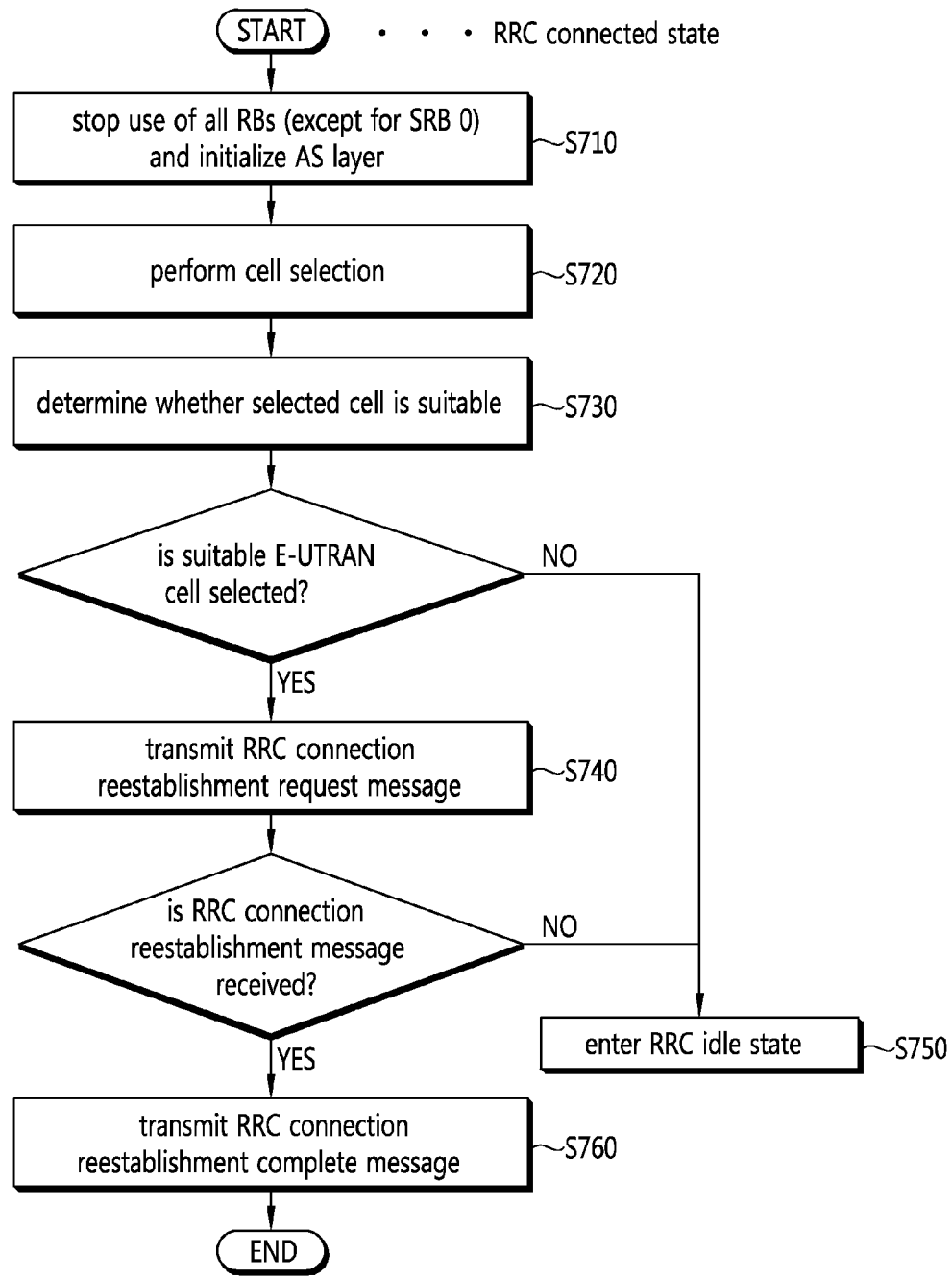
FIG. 7 is a view illustrating a RRC connection reestablishment procedure.

FIG. 7 is a view illustrating an RRC connection reestablishment procedure.

Referring to FIG. 7, the terminal pauses to use all of the radio bearers configured except SRB 0 (Signaling Radio Bearer #0) to initialize various sublayers of the AS (Access Stratum) (S710). Further, the terminal sets each sublayer and physical layer as default configuration. During this process, the terminal maintains the RRC connected state.

The terminal performs the cell selection procedure to perform the RRC connection reconfiguration procedure (S720). The cell selection procedure of the RRC connection reestablishment procedure may be conducted similar to the cell selection procedure performed when the terminal is in the RRC idle state although the terminal maintains the RRC connected state.

The terminal identifies the system information of the cell after performing the cell selection procedure to determine whether the cell is a proper cell (S730). In case the selected cell is determined to be a proper E-UTRAN cell, the terminal sends an RRC connection reestablishment request message to the cell (S740).

On the other hand, in case the cell selected through the cell selection procedure to perform the RRC connection reestablishment procedure is determined to be a cell using other RAT than the E-UTRAN, the terminal stops the RRC connection reestablishment procedure and enters the RRC idle state (S750).

The terminal may be implemented to finish identifying whether the cell is proper by receiving the system information of the selected cell and the cell selection procedure. To the end, the terminal may activate a timer as it initiates the RRC connection reestablishment procedure. The timer may stop in case the terminal is determined to have selected a proper cell. In case the timer expires, the terminal may consider the RRC connection reestablishment procedure to fail and enter the RRC idle state. This time is hereinafter referred to as a radio link failure timer. In the LTE specification TS 36.331, the timer denoted T311 may be utilized as the radio link failure timer. The terminal may obtain the setting values of the timer from the system information of the serving cell.

When receiving the RRC connection reestablishment request message from the terminal and accepting the request, the cell sends an RRC connection reestablishment message to the terminal.

When receiving the RRC connection reestablishment message from the cell, the terminal reconfigures the PDCP sublayer and the RLC sublayer for SRB1. Further, the terminal recalculates various key values relating to security settings and reconfigures the PDCP sublayer that is in charge of security with the newly calculated security key values. By doing so, SRB 1 between the terminal and the cell is opened, allowing for exchange of RRC control messages. The terminal completes resumption of SRB1 and sends to the cell an RRC connection reestablishment complete message indicating that the RRC connection reestablishment procedure has been complete (S760).

In contrast, when receiving the RRC connection reestablishment request message from the terminal but does not accept the request, the cell sends an RRC connection reestablishment reject message to the terminal.

If the RRC connection reestablishment procedure is successfully done, the cell and the terminal perform the RRC connection reconfiguration procedure. Through this, the terminal recovers to the state before the RRC connection reestablishment procedure is conducted and maximally ensure service continuity.

Subsequently, RLF reporting is described.

If an RLF occurs or handover failure occurs, the terminal reports such failure event to the network so as to support MRO (Mobility Robustness Optimization).

After the RRC connection reestablishment, the terminal may offer an RLF report to the eNB. The radio measurement included in the RLF report may be used as potential reason for the failure to identify coverage issues. Such information may be used to exclude such events from the MRO evaluation on the mobility connection failure and reuse the events as input for other algorithms.

In case the RRC connection reestablishment fails or the terminal cannot perform the RRC connection reestablishment, the terminal make reconnection in the idle mode and may then generate a valid RLF report on the eNB. To that end, the terminal may store information relating to the latest RLF or handover failure and may indicate to the LTE cell that the RLF report is valid for every subsequent RRC connection (re)establishment and handover until the RLF report is called in by the network or for 48 hours after the handover failure is detected.

The terminal maintains the information during the state shift and RAT variation, returns to the LTE RAT, and then indicates again that then RLF report is valid.

In the RRC connection setup procedure, the RLF report being valid indicates that the terminal has been hampered such as by connection failure, and due to such failure, the RLF report has not been yet delivered to the network. The RLF report from the terminal contains the following information:

The last cell (in the case of RLF) that has provided service to the terminal or E-CGI of the target of handover. Unless the E-CGI has been known, PCI and frequency information are used instead.

E-CGI of the cell where reestablishment has been attempted.

E-CGI of the cell that has provided service to the terminal upon initialization of the last handover, for example, when message 7 (RRC connection reconfiguration) has been received by the terminal Time that has elapsed from initialization of the last handover to connection failure.

Information indicating whether the connection failure comes from RLF or handover failure.

Radio measurements.

Position of failure.

The eNB that has received the RLF failure from the terminal may forward the report to the eNB that provided service before the reported connection failure. The radio measurements contained in the RLF report may be used to identify coverage issues as the potential reason for radio link failure. Such information may be used to exclude such events from the MRO evaluation of the intra-LTE mobility connection failure and resend the same as inputs for other algorithms.

Next, MBMS (Multimedia Broadcast and Multicast Service) is described in greater detail.

The transport channel MCH channel, for MBMS may be mapped with the logical channel MCCH channel or MTCH channel. The MCCH channel transmits an MBMS-related RRC message, and then MTCH channel transmits traffic of a particular MBMS service. For one MBSFN (MBMS Single Frequency Network) area which transmits the same MBMS information/traffic, one MCCH channel is present, and in case a plurality of MBSFN areas are offered in one cell, the terminal may receive a plurality of MCCH channels. In case the MBMS-related RRC message varies in the particular MCCH channel, the PDCCH channel transmits an indicator indicating the specific MCCH channel and M-RNTI (MBMS Radio Network Temporary Identity). The MBMS-supportive terminal receives the M-RNTI and the MCCH indicator through the PDCCH channel to grasp that the MBMS-related RRC message has varied in the specific MCCH channel and may receive the specific MCCH channel. The RRC message of the MCCH channel may vary every variation period and is repeatedly broadcast every repetition period.

The terminal may receive a dedicated service while the MBMS is provided. For example, some user may chat using an IM (instant messaging) service such as Skype or MSN using his smartphone while viewing TV through the smartphone, through the MBMS. In this case, the MBMS is to be provided through the MTCH jointly received by various terminals, and the service individually provided to each terminal, such as the IM service, is to be provided through a dedicated bearer such as DCCH or DTCH.

Some base station may use a number of frequencies at the same time in one area. In this case, the network may select one of a number of frequencies to efficiently use radio resources, provide the MBMS to only the selected frequency, and provide the dedicated bearer to each terminal at all the frequencies.

In this case, if the terminal, which has been serviced using the dedicated bearer at the frequency that does not provide the MBMS, desires to receive the MBMS, the terminal should hand over the frequency that provides the MBMS. To that end, the terminal sends an MBMS interest indication to the base station. That is, the terminal, when desiring to receive the MBMS, sends the MBMS interest indication to the base station, and the base station, when receiving the indication, recognizes that the terminal wants to receive the MBMS, and shifts the terminal to the frequency that provides the MBMS. Here, the MBMS interest indication means information indicating that the terminal desires to receive the MBMS and additionally contains information regarding the frequency to which the terminal desires to shift.

Further, the terminal may select the cell on the frequency that provides the MBMS as a target cell through the inter-frequency cell reselection to the frequency that provides the MBMS. Through this, the terminal may approach the cell, and if the cell provides the MBMS, may receive the same. In order to allow the terminal to select the cell on the frequency that may provide the MBMS as possible, the frequency may be applied with the highest priority. The cell reselection method regarding this is described below in detail with reference to FIG. 8.

Figure 8:
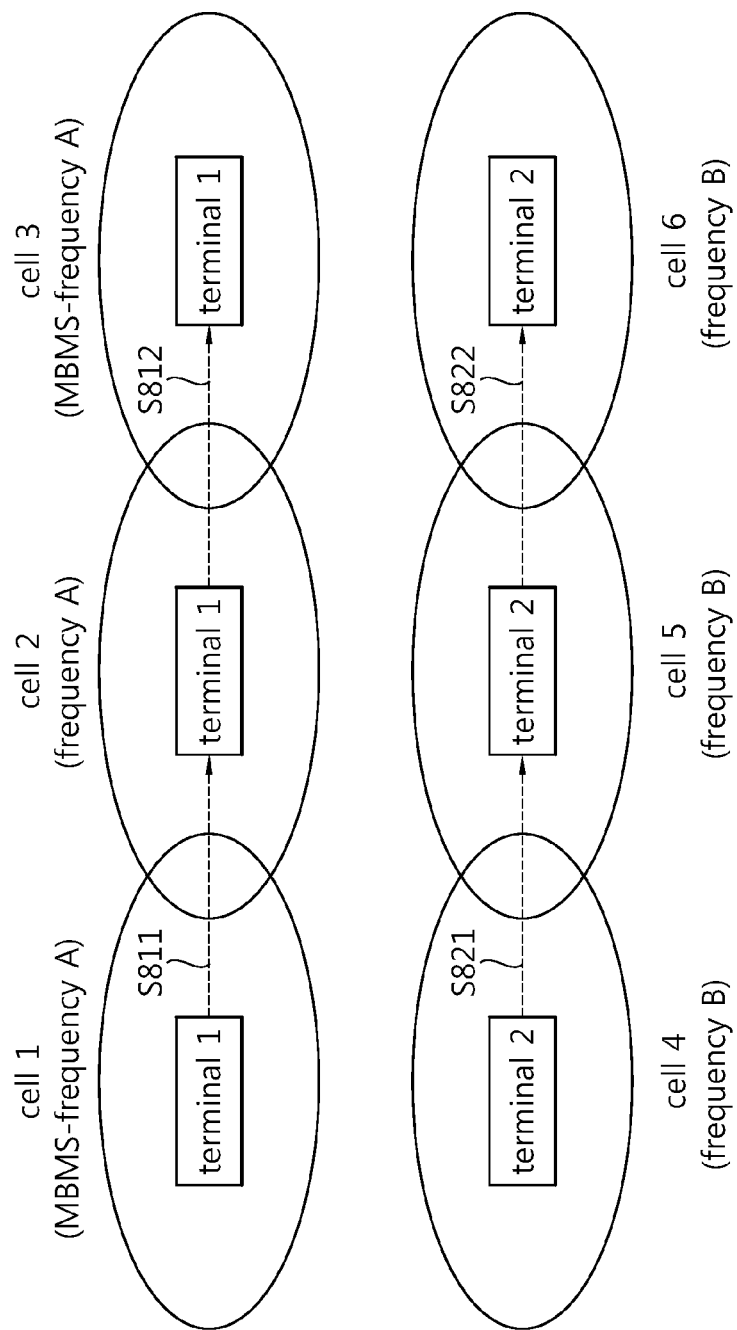
FIG. 8 is a view illustrating an example of performing cell reselection of a terminal relating to an MBMS.

FIG. 8 is a view illustrating an example of performing cell reselection by a terminal in relation to an MBMS.

The terminal that is receiving the MBMS on a specific frequency or that is interested in receiving the MBMS applies the highest priority to the frequency in conducting cell reselection. The terminal may shift to the cell that provides the MBMS by performing cell reselection using the priority information on the frequency reconfigured with the highest priority instead of the frequency priority signaled by the network, to thus be able to receive the MBMS.

Referring to FIG. 8, it is assumed that terminal 1 is a terminal that is receiving the MBMS or that is interested in receiving the MBMS, and terminal 2 is a terminal that isn't so. Further, it is assumed that cells 1, 2, and 3 are operated at frequency A, and cells 4, 5, and 6 are operated at frequency B. Here, it is assumed that cells 1 and 2 have the same coverage, cells 3 and 4 have the same coverage, and cells 5 and 6 have the same coverage. Further, it is assumed that the priority corresponding to frequency A signaled by the network is '3,' and the priority corresponding to frequency B is '5.'

Terminal 1 approaches cell 1 and is receiving the MBMS from cell 1. In case terminal 1 departs from the coverage of cell 1, a new target cell is determined through cell reselection. Since terminal 1 has been receiving the MBMS, the cell reselection is conducted with frequency A, which is the frequency providing the MBMS, applied with the highest priority. Accordingly, terminal 1 may determine cell 2 as the target cell and may approach cell 2 (S811). In case terminal 1 departing from the coverage of cell 2, cell reselection is performed with the highest priority applied to frequency A. Accordingly, terminal 1 determines cell 3 as the target cell and may approach cell 3 (S812).

Terminal 2 approaches cell 4 and is receiving service from cell 4. In case terminal 2 departs from the coverage of cell 2, a new target cell is determined through cell reselection.

Since terminal 2 is not related to the MBMS, cell reselection is conducted with the frequency priority signaled from the network applied. Accordingly, the terminal determines cell 5 being operated at frequency B with a priority of 5, instead of cell 2 operated at frequency A with a priority of 3 as the target cell and may approach cell 5 (S821). Subsequently, if the terminal departs from the coverage of cell 5, the terminal may determine cell 6 as the target cell based on the signaled priority and approach cell 6 (S822).

As described above, terminal 1 that has received the MBMS applies the highest priority to the specific frequency providing then MBMS to perform cell reselection and thus may approach the cell providing the MBMS as possible.

Meanwhile, when applying the highest priority, upon cell reselection, to the specific frequency predicted to provide the MBMS by the terminal, the terminal may determine a cell, which has a low priority and does not provide the MBMS, as the target cell. In the example illustrated in FIG. 8, cell 2 does not provide the MBMS on frequency A but frequency A is applied with the highest priority, and thus, the terminal selects cell 2 as the target cell and approaches the cell. In case there are a number of terminals desiring to receive the MBMS, the terminals may approach a cell that does not actually provide the MBMS, and this may cause unnecessary congestion in the cell.

In case the cell that has originally provided the MBMS experiences severe congestion, the cell may pause the provision of the MBMS to switch the MBMS-related traffic to unicast traffic. However, even when the cell pauses the MBMS, the terminal may perform cell reselection by continuing to apply the highest priority to the frequency of the cell and may intend to steadily access the frequency. If such terminals approach the cell, the cell may suffer from increasing traffic to the terminals. This may be against the operation of the cell base station and/or the operation of network that are intended to mitigate cell congestion by pausing the MBMS.

Hereinafter, to address the above issues, a cell reselection method in which the terminal applies the highest priority to the MBMS-related frequency only when necessary is proposed.

Figure 9:
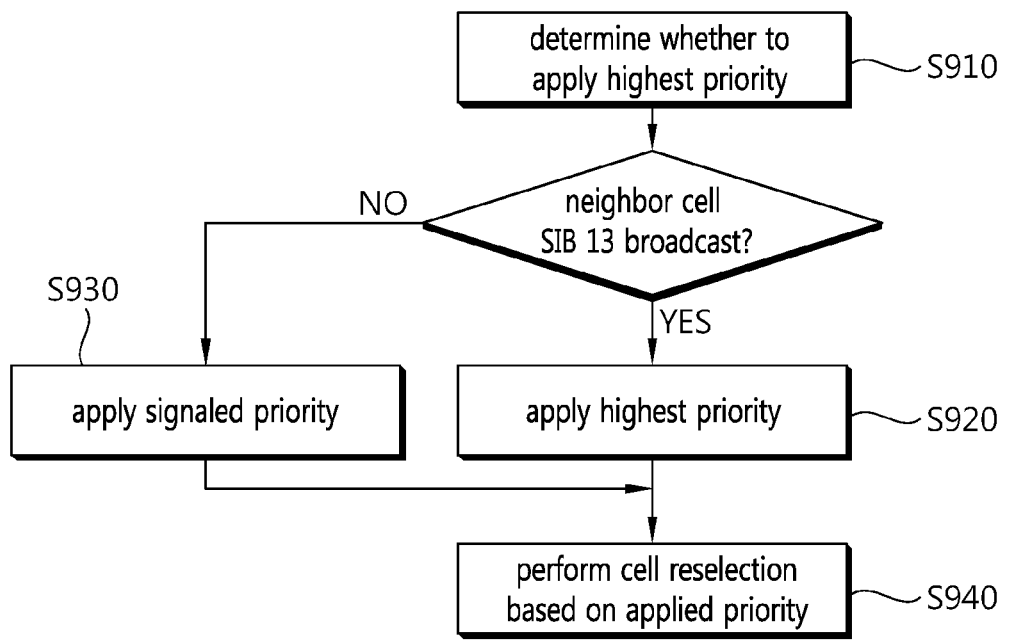
FIG. 9 is a flowchart illustrating an example of performing cell reselection according to an embodiment of the present invention.

FIG. 9 is a flowchart illustrating an example of performing cell reselection according to an embodiment of the present invention.

Referring to FIG. 9, the terminal determines whether to apply the highest priority to a specific frequency in cell reselection (S910). The highest priority may mean a priority higher than a priority signaled by the network.

The specific frequency to which the terminal may provide the highest priority may be a frequency at which the MBMS has been offered or the MBMS is predicted to be offered. Determining whether to apply the highest priority to the frequency may be implemented as the operation of identifying whether system information required for obtaining the MBMS control information is broadcast.

The system information required for obtaining the MBMS control information may be SIB 13 among the system information broadcast by the cell. Accordingly, the terminal may identify whether SIB 13 is being broadcast by the neighbor cell, and if SIB 13 is broadcast, may determine to apply the highest priority to the frequency.

Only when the neighbor cell operated at the frequency is broadcasting the system information required for obtaining the MBMS control information, the highest priority may be applied to the frequency (S920).

In contrast, unless the neighbor cell operated at the frequency broadcasts the system information required for obtaining the MBMS control information, the priority signaled by the network may be applied to the frequency (S930).

The terminal may perform cell reselection based on the applied priority and may approach the selected target cell (S940).

Figure 10:
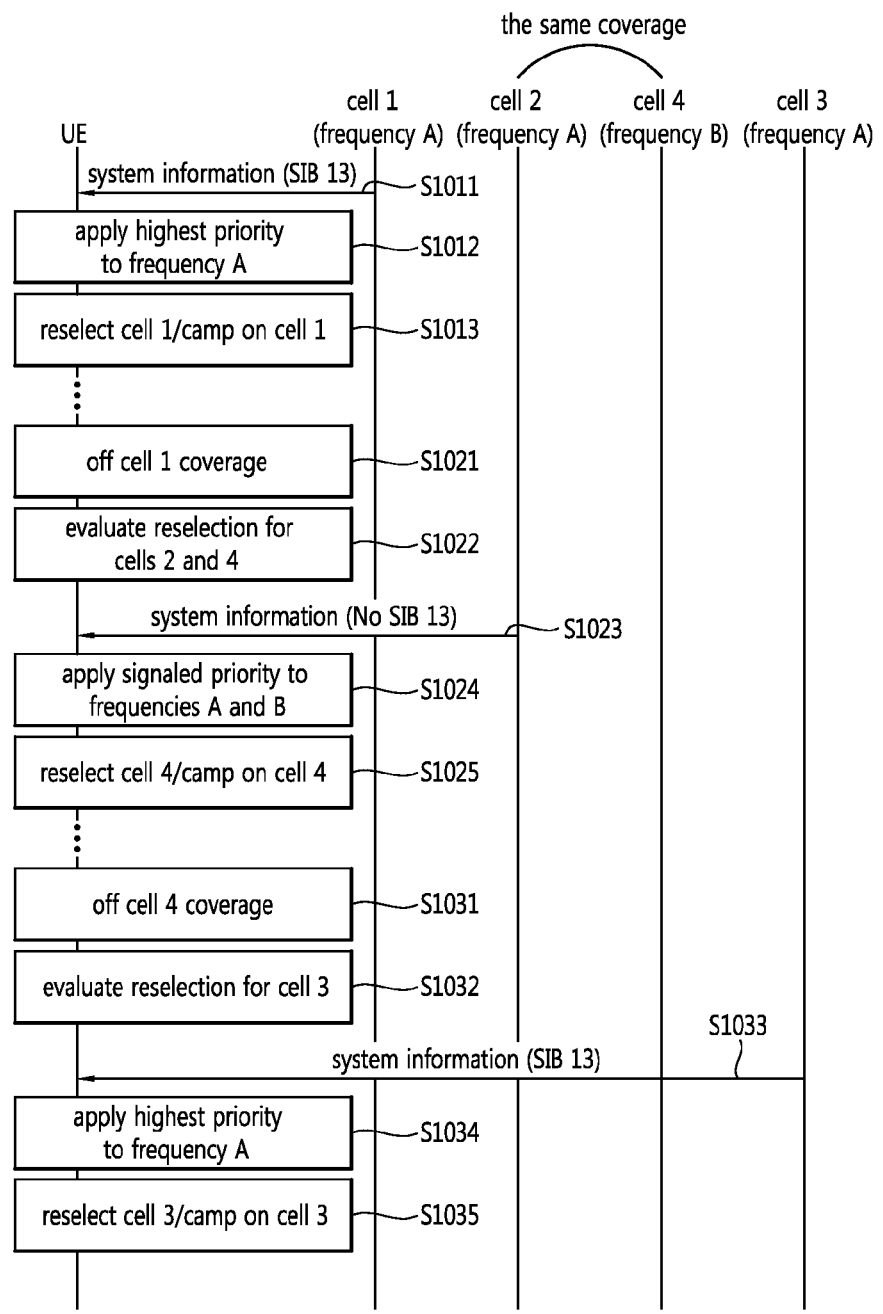
FIG. 10 is a flowchart illustrating an example cell reselection method according to an embodiment of the present invention.

FIG. 10 is a flowchart illustrating an example cell reselection method according to an embodiment of the present invention.

In the instant example, it is assumed that cells 1, 2, and 3 are operated on frequency A, and cell 4 is operated on frequency B. It is assumed that the priority signaled by the network is '3' for frequency A and '5' for frequency B. It is assumed that cells 2 and 4 have the same coverage and that the terminal departs from the coverage of cell 1 to enter the coverage of cells 2 and 4. It is assumed that the terminal has been receiving the MBMS or is interested in receiving the MBMS on the frequency.

The terminal performs cell reselection evaluation on cell 1. The terminal receives system information from cell 1 and receives SIB 13 required for obtaining the MBMS control information (S1011). The terminal identifies that SIB 13 is broadcast from cell 1 and may determine to apply the highest priority to frequency A.

The terminal applies the highest priority to frequency A (S1012) and performs cell reselection based on the applied priority. Accordingly, the terminal may reselect cell 1 and camp on cell 1 (S1013).

The terminal may depart from the coverage of cell 1 and approach the coverage of cells 2 and 4 (S1021). Accordingly, the terminal performs cell reselection evaluation on cells 2 and 4 (S1022).

Since cell 2 does not provide the MBMS, it might not broadcast SIB 13. The terminal receives system information from cell 2 but cannot receive SIB 13 required for obtaining the MBMS control information (S1023). Accordingly, the terminal applies the priority signaled from the network to frequency A and frequency B (S1024).

The terminal performs cell reselection based on the applied priority. Since the priority for frequency A is '3' and the priority for frequency B is '5,' the terminal may reselect cell 4 that is operated on frequency B and camp on cell 4 (S1025).

The terminal may depart from the coverage of cell 4 and approach the coverage of cell 3 (S1031). Accordingly, the terminal performs cell reselection evaluation on cell 3 (S1032).

Since the terminal has previously received the MBMS and is interested in receiving the MBMS, the terminal may determine whether cell 3 is broadcasting SIB 13 required for obtaining the MBMS control information. Accordingly, the terminal receives the system information from cell 3 and receives SIB 13 required for obtaining the MBMS control information (S1033). The terminal may identify that SIB 13 is broadcast from cell 1 and determine to apply the highest priority to frequency A.

The terminal applies the highest priority to frequency A (A1034) and performs cell reselection based on the applied priority. Accordingly, the terminal may reselect cell 3 and camp on cell 3 (S1035).

Figure 11:
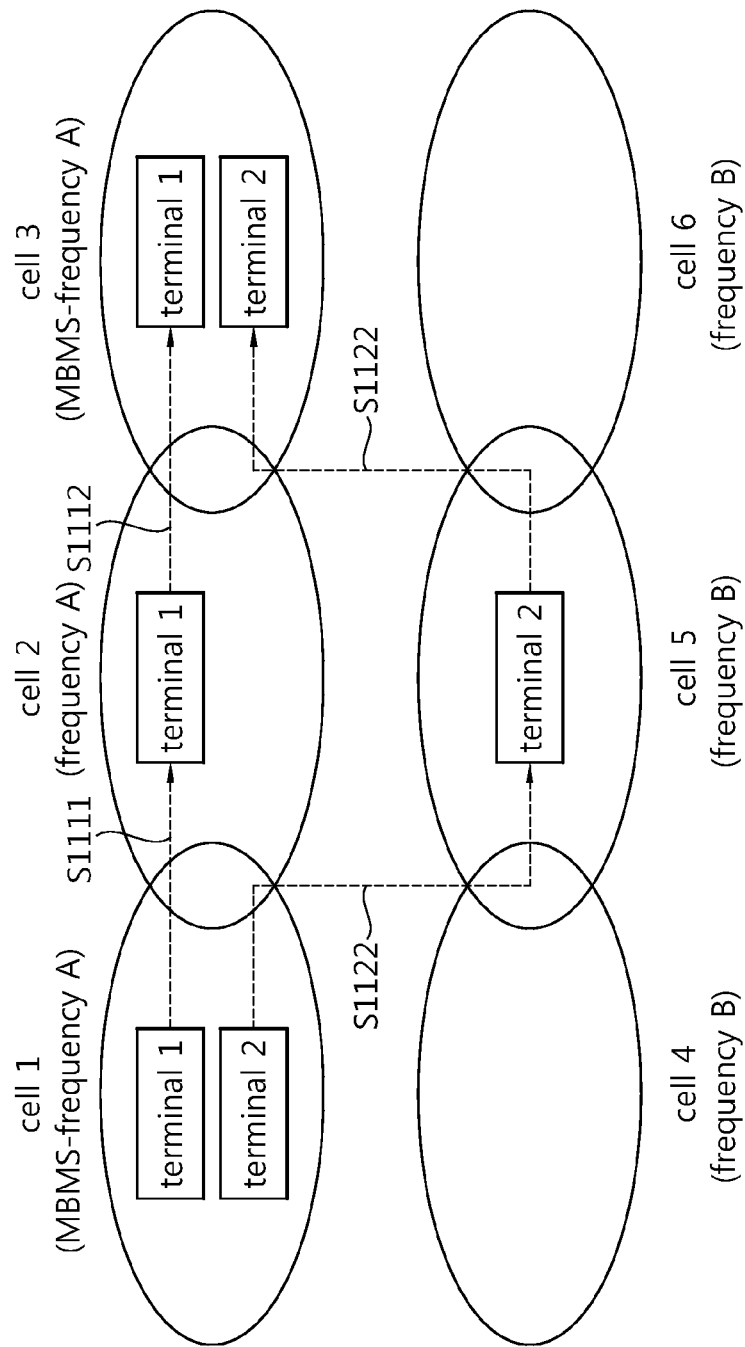
FIG. 11 is a view illustrating an example of terminal shift when a contention solution message applies, according to an embodiment of the present invention.

FIG. 11 is a view illustrating an example of terminal shift when adopting a cell reselection method according to an embodiment of the present invention.

In the example illustrated in FIG. 11, it is assumed that terminals 1 and 2 are receiving the MBMS or are interested in receiving the MBMS. It is assumed that cells 1, 2, and 3 are operated on frequency A and cells 4, 5, and 6 are operated on frequency B. Here, it is assumed that cells 1 and 2 have the same coverage, cells 3 and 4 have the same coverage, and cells 5 and 6 have the same coverage. Further, it is assumed that the priority for frequency A signaled by the network is '3,' and the priority for frequency B is '5.' In this example, it is assumed that terminal 1 moves based on the existing cell reselection method and that terminal 2 moves based on the MBMS-based cell reselection method proposed herein.

Referring to FIG. 11, terminal 1 approaches cell 1 and is receiving the MBMS from cell 1. In case terminal 1 departs from the coverage of cell 1, it determines a new target cell through cell reselection. Since terminal 1 moves based on the existing cell reselection scheme, it applies the highest priority to frequency A of cell 2 without determining whether cell 2 actually provides the MBMS. Accordingly, terminal 1 determines cell 2 as the target cell and may approach cell 2 (S1111). In case terminal 1 departs from the coverage of cell 2, it applies the highest priority to frequency A to perform cell reselection. Accordingly, terminal 1 may determine cell 3 as the target cell and approach cell 3 (S1112).

Terminal 2 approaches cell 1 and is receiving the MBMS from cell 1. In case terminal 1 departs from the coverage of cell 1, it determines a new target cell through cell reselection. Since terminal 2 moves based on the cell reselection scheme proposed according to the present invention, it may determine whether frequency A of cell 2 actually provides the MBMS. To the end, the terminal determines whether SIB 13 required for obtaining the MBMS control information is being broadcast from cell 2. If cell 2 is determined not to broadcast SIB 13, the terminal may apply the priorities signaled from the network to frequency A of cell 2 and frequency B of cell 5, respectively. Accordingly, the terminal may determine, as the target cell, cell 5 operated at frequency B whose priority is 5, instead of cell 2 operated at frequency A whose priority is 3 (S1121).

Subsequently, if the terminal departs from the coverage of cell 5 and enters the coverage of cells 3 and 6, it may determine whether cell 3 operated at frequency A predicted to provide the MBMS service actually provides the MBMS. To that end, the terminal determines whether SIB 13 is being broadcast from cell 3. If cell 3 is determined not to broadcast SIB 13, the terminal may apply the highest priority to frequency A of cell 3. Accordingly, the terminal may determine cell 3 as the target cell and approach cell 3 (S1122).

In the MBMS-based cell reselection method described above in connection with FIGS. 8 to 11, if a specific frequency does not provide MBMS and the terminal thus leaves the frequency, the terminal may not consider applying the highest priority to the frequency until specific conditions are met. In case, in the example illustrated in FIG. 11, terminal 2 identifies that SIB 13 is not broadcast at frequency A of cell 2 and selects cell 5 operated at frequency B through cell reselection and approaches the cell, it may not consider applying the highest priority to frequency A until the specific conditions are met. The specific conditions may be as follows:

1. Upon changing serving cells by cell selection or cell reselection
2. Upon changing tracking areas
3. When prohibit timer expires In the case of the condition relating to the prohibit timer, the terminal, if determining that no MBMS is provided at the frequency of a specific cell, may initiate the prohibit timer, and if determining that the MBMS is provided at the frequency of other cell, may reset the prohibit timer. In the case of resetting the prohibit timer, the terminal may determine whether to apply the highest priority to the frequency, and depending on a result of the determination, apply the priority. Through the conditions, the terminal may be prevented from shifting to other frequency to reapply the highest priority to the existing frequency, thus preventing the Ping Pong phenomenon from occurring.

By the MBMS-based cell reselection method proposed herein, the terminal may be prevented from approaching the cell of frequency that does not provide MBMS. Further, in the environment where the radio resources are intended to switch from MBMS traffic to unicast traffic due to congestion, the terminals desiring to receive the MBMS may be prevented from jamming up. In other words, the terminal may identify whether the cell actually provides the MBMS and may not apply the highest priority to the frequency of the cell. Through this, the terminal may, instead of the cell that does not provide the MBMS and has low frequency priority, select and approach other cell on the high-priority frequency. Since the terminal may be avoided from approach to the congested cell, the terminal may receive more efficient service, and the network may provide efficient service through proper load balancing.

Figure 12:
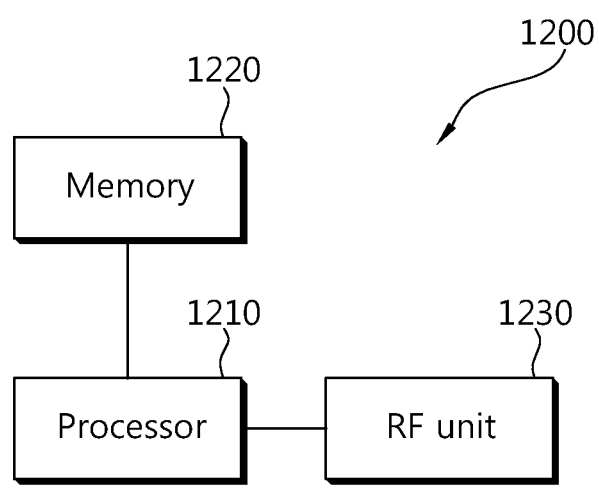
FIG. 12 is a block diagram illustrating a wireless device in which an embodiment of the present invention is implemented.

FIG. 12 is a block diagram illustrating a wireless device where an embodiment of the present invention is implemented. This device may be implemented to perform the cell reselection method according to an embodiment of the present invention, as described above in connection with FIGS. 8 to 11.

The wireless device 1200 includes a processor 1210, a memory 1220, and an RF (radio frequency) unit 1230. The processor 1210 implements the functions, processes, and/or methods as proposed. The processor 1210 may be configured to determine whether to apply the highest priority to a specific frequency. The processor 1210 may be configured to identify whether the frequency is broadcasting SIB 13 for determining whether to apply the highest priority. The processor 1210 may be configured to perform cell reselection by applying the priority signaled by the network or the highest priority to the specific frequency depending on a result of the determination. The processor 1210 may be configured to implement the embodiments of the present invention described above with reference to the drawings.

The RF unit 1230 is connected with the processor 1210 and transmits and receives radio signals.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for cell reselection in a wireless communication system, the method performed by a user equipment (UE) and comprising:
   determining whether a Multicast Broadcast Multimedia Service (MBMS) is provided from a first neighbor cell on an MBMS frequency while the UE camps on a serving cell on the MBMS frequency; and
   performing cell reselection determination, from the serving cell on the MBMS frequency to a second neighbor cell on a non-MBMS frequency even though the UE is interested in reception o f the MBMS if the MBMS is not provided from the first neighbor cell on the MBMS frequency;
   initiating a prohibit timer upon performing the cell reselection determination; and
   determining whether to camp on the second neighbor cell on the non-MBMS frequency or perform cell reselection based on the prohibit timer,
   wherein the UE camps on the second neighbor cell on the non-MBMS frequency and prohibits camping on a third neighbor cell on the MBMS frequency even though the UE is interested in reception of the MBMS while the prohibit timer is running, and
   wherein the UE determines whether the MBMS is provided from the third neighbor cell on the MBMS frequency and performs the cell reselection based on the determination when the prohibit timer expires.

2. The method of claim 1, further comprising resetting the prohibit timer if a tracking area is changed.

3. A user equipment (UE) performing cell reselection in a wireless communication system, the UE comprising:
   a Radio Frequency (RF) unit that transmits and receives radio signals; and
   a processor operatively coupled with the RF unit and that:
   determines whether a Multicast Broadcast Multimedia Service (MBMS) is provided from a first neighbor cell on an MBMS frequency while the UE camps on a serving cell on the MBMS frequency; and
   performs cell reselection determination
   from the serving cell on the MBMS frequency to a second neighbor cell on a non-MBMS frequency even though the UE is interested in reception of the MBMS if the MBMS is not provided from the first neighbor cell on the MBMS frequency;
   initiates a prohibit timer upon performing the cell reselection determination; and
   determines whether to camp on the second neighbor cell on the non-MBMS frequency or perform cell reselection based on the prohibit timer,
   wherein the processor camps on the second neighbor cell on the non-MBMS frequency and prohibits camping on a third neighbor cell on the MBMS frequency even though the UE is interested in reception of the MBMS while the prohibit timer is running, and
   wherein the processor determines whether the MBMS is provided from the third neighbor cell on the MBMS frequency and performs the cell reselection based on the determination when the prohibit timer expires.

4. The UE of claim 3, wherein the processor resets the prohibit timer if a tracking area is changed.

* * * * *